Dec. 26, 1939.   H. L. GRUPE ET AL   2,184,342
ELECTRICAL COIL AND PROCESS FOR MAKING THE SAME
Filed Jan. 27, 1938
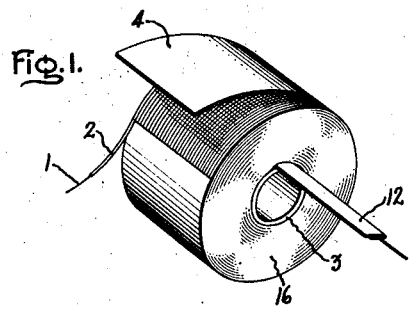
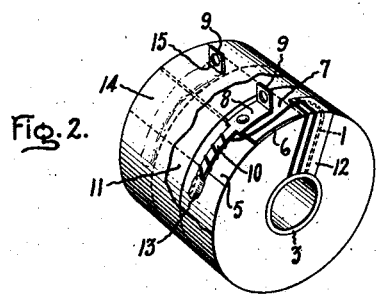
Inventors:
Herman L. Grupe,
James A. Robertson,
Don E. Moran,
by Harry E. Dunham
Their Attorney.

Patented Dec. 26, 1939

2,184,342

UNITED STATES PATENT OFFICE 2,184,342

ELECTRICAL COIL AND PROCESS FOR MAKING THE SAME

Herman L. Grupe, Scotia, N. Y., James A. Robertson, Framingham, Mass., and Don E. Moran, Scotia, N. Y.; said Grupe and said Moran assignors to General Electric Company, a corporation of New York, and said Robertson assignor to Warren Telechron Company, a corporation of Maine Application January 27, 1938, Serial No. 187,202

8 Claims. (Cl. 175—21)

The present invention relates to an electrical coil and process for making the same.

The principal object of the invention is to produce at low cost a compact electrical coil of improved moisture resistance and high dielectric strength.

It has been suggested heretofore to render electrical coils impervious to moisture by providing a continuous imperforate envelope of cellulosic material, for example cellulose acetate, completely surrounding the coiled conductor. Our experience has indicated that the electrical coil itself, consisting of alternate layers of helices of enameled wire and wraps of insulation such as paper, is not appreciably affected by moisture under ordinary service conditions. The weak point in the usual coil is the splice or joint between the small wire of the coil and the larger wire lead or copper terminal. We have found that electrical failure most commonly occurs in this splice or in the fine wire winding adjacent the splice and where the insulating enamel has been removed either in preparation for soldering or by the heat of brazing. The present invention is directed particularly to the prevention of electrical breakdown in this splice and adjoining region by surrounding (enveloping) the same with materials that will not have a corrosive action thereon in the presence of moisture.

The novel features characteristic of our invention are set forth in the appended claims. The invention itself, however, will best be understood by reference to the following specification when considered in connection with the accompanying drawing in which Fig. 1 is a view in perspective showing the first steps in making the coil of the invention; and Fig. 2 is a similar view of the completed coil, with a part broken away for the sake of clearness and showing one of the terminals of the terminal assembly joined to the end of the winding.

In carrying the invention into effect a suitable conductor, for example a copper wire 1, is first provided in any suitable manner with a film of insulation 2 in the form of an enamel. The enameled wire is then wound on a suitable temporary or permanent core 3 such, for example, as a shellac-coated kraft paper tube or a molded phenol-aldehyde resin tube. Each layer of helices of enameled wire usually is covered by a thin sheet of a suitable layer insulating material 4, which preferably also covers the last layer of conductor helices. We prefer to use as layer insulation a dry thin sheet of kraft or glassine paper. For certain coil designs or applications the layer insulation may be omitted.

The coil winding and layer insulation are partly or completely covered, as desired or as conditions may require, with a wrapping 5 of flexible material of high dielectric strength and moisture resistance, a portion of which is shown in the broken-away part of Fig. 2. This wrapping may take the form of, for instance, varnished cambric or sheet cellulose ester, for example cellulose acetate, and may be of any suitable thickness.

In accordance with the embodiment of the invention shown by way of illustration in Fig. 2, a terminal assembly 6 is fastened in position, as subsequently will be described, upon the wrapping 5. This wrapping, if it does not completely cover the coil winding and layer insulation, at least covers a substantial area of the same under and near the terminal assembly. The assembly 6 comprises a base or support 7 formed of any suitable electrically insulating material such, for instance, as hard paper or fiber of adequate stiffness. Mounted upon the support 7 by any suitable means are the terminals 8 having outer or upper extensions 9 and inner or lower extensions 10. The terminals may be mounted on the support with the extensions 10 each pointing in the same direction and parallel to the coil ends as shown in Fig. 2. Or, if desired, the one terminal extension may lead in one direction (parallel to the coil ends), and the other in the opposite direction, thereby obtaining somewhat greater electrical strength.

The assembly 6 is held in place upon the wrapping 5, for example by means of a binding tape 11, which preferably is formed of suitable textile material, for instance artificial silk, coated on its inner side with an adhesive. It is important that both the textile material and the adhesive thereon be non-corrosive in the presence of moisture. Material known in the trade as "Scotch Celanese" electrical tape advantageously may be employed. In accordance with our preferred practice the tape 11 is applied over the terminal assembly base 7 at a point between the terminals 8, with the ends of the tape adhesively bound to the wrapping 5 and wholly or partly encircling the coil.

The inner end of the insulated wire 1 is brought up and over the end of the wound coil through a protective wrapping 12 of suitable flexible insulating material such, for example, as varnished cambric or sheet cellulose ester such as the acetate. The inner and outer ends of the wire 1 are cleaned of insulating enamel. The ends of the bare wire are wrapped around each of the tinned ends of the terminal extensions 10. The wire and terminal extension ends are then united, for example by soldering, brazing, welding or the like, to form the joints or splices 13. Particularly in the case of small coils a convenient method of making these joints is to cover the wire and terminal extension ends with a suitable non-corrosive flux, for instance by dipping in an alcohol solution of rosin, and then to solder the wire ends to the terminals.

The joints 13, the adjacent wire 1 and the terminal extensions 10 are covered with cellulose ester, preferably cellulose acetate. This covering preferably takes the form of a coating deposited from solution state, for example by dipping the said parts in, or spraying with a solution of cellulose ester. Thus the parts may be immersed in a solution of cellulose acetate dissolved in a suitable solvent such as acetone, and the coated parts then dried to evaporate the solvent. In this way each of the joints formed between the bare inner and outer ends of the conductor and the terminals is completely and separately enclosed by a covering of cellulose ester, specifically cellulose acetate. This covering intimately and completely envelops the individual joint, thereby insulating and moisture-proofing it and preventing electrical breakdown therein. Instead of covering the aforesaid parts with a film of cellulose ester deposited from solution state, it may be desirable in certain cases to cover these parts with a thin sheet of cellulose ester. Such sheet material may be a patch of a size sufficient to cover the joints 13, adjacent wire 1 and the terminal extensions 10, or it may be a continuous length completely encircling the coil, including the said parts. Among other cellulose esters which may be used in moisture-proofing and electrically insulating the joints 13 and the adjacent parts are, for example, cellulose propionate, cellulose butyrate and cellulose triesters such as cellulose triacetate.

Having bent the terminal extensions 10 to the curvature of the coil and to fit closely upon the wrapping 5, a protective covering 14 comprising fibrous material in sheet, woven or other suitable form, for example, cotton, linen or glass cloth, paper, or sheet or woven asbestos, is next applied. Such fibrous material desirably is adhesively bonded to the underlying contacting parts. A fibrous material having on its inner side a coating of an adhesive which will bond to the cellulose ester may be used.

The covering 14 advantageously comprises a fibrous material which is coated, preferably on both sides but at least on its inner side, with an electrically insulating material that is non-corrosive in the presence of moisture. Cellulose ester such as the acetate is an example of such an insulating material. A preferred form of covering 14 is a flexible laminated insulating material comprising cotton or linen cloth having bonded to each side thereof a sheet of cellulose ester, preferably cellulose acetate. This may be bonded to the underlying parts in contact therewith by means of an adhesive comprising a cellulose ester, for instance with cellulose acetate cement. In this way the terminal assembly 6, the bent-over portion of the protective wrapping 12, and the inner end of the wire 1 leading from the said wrapping to the said assembly are held firmly in place and are further moisture-proofed. The outer extensions 9 of the terminals 8 are passed through the slotted openings in the covering 14 as shown at 15.

In accordance with one embodiment of the invention, instead of mounting the terminals upon a base 7 as shown in Fig. 2, the upper flat portions of the terminals may be interposed between lower and upper layers of sheet cellulose ester, such as cellulose acetate. The outer extensions 9 of the terminals are passed through suitable slots in the upper cellulose ester layer. The two layers and the intervening terminals are bonded together by any suitable means, for example with a suitable adhesive. Or, the cellulose ester layers may be bonded to each other and to the surfaces of the terminals under heat and pressure. Another useful method comprises moistening the cellulose ester layers with a suitable solvent after the terminals are in position. The solvent is then evaporated, whereupon the layers of cellulose ester shrink and bond to each other and to the terminal surfaces. Specifically, when the cellulose ester is cellulose acetate, the solvent advantageously may be acetone in carrying the last-described method into effect. By all methods the resulting bond is sufficiently strong to hold the terminals firmly in place.

In the construction of certain types of coils we may use flexible leads instead of fixed copper terminals of the kind shown by way of illustration in Fig. 2. In such case the soldered joints between such leads and the ends of the insulated conductor winding are covered with cellulose ester as hereinbefore described. The term "terminals" as used in the appended claims is intended to include within its meaning such flexible leads. The term "joints" as used generally herein and in the appended claims includes within its meaning not only the unions resulting from uniting, as by soldering, the bare inner and outer ends of the conductor winding to the terminals but also the bare portions of the conductor winding immediately adjacent such unions.

From the foregoing description it will be noted that the insulated wire 1, the terminals 8, and the joints 13 therebetween are not covered or enveloped by any materials which will become corrosive in the presence of moisture. We have found that all the usual papers, cloths and glues commonly employed for finishing coils decompose and form corrosive acids in the presence of moisture. We therefore avoid the use of such materials.

A coil made as above described is generally used without any further treatment other, perhaps, than to improve its appearance. However, sometimes it may be advantageous to seal the open ends 16 of the coil. This may be done, for example, by immersing the coil ends in a suitable electrically insulating sealing and moisture-proofing composition or varnish. One example of such a composition which we may use comprises an acetone solution of cellulose acetate. The treated coil is then dried to evaporate the solvent and to seal the ends with a film of cellulose acetate.

Ordinarily, when it appears desirable to treat the coil with a sealing and moisture-proofing composition, we prefer to use a normally solid, meltable waxy or resinous material such, for instance, as a mixture of rosin and paraffin. In such case the whole coil preferably is immersed in a bath of the molten compound for a suitable period. The impregnating time may vary, for example, from a few minutes to several hours, depending upon the coil size, temperature of impregnation, viscosity of the molten compound, and other influencing factors. The coil is then removed from the bath and cooled to solidify the treating compound. We have found a composition comprising a homogeneous mixture of, by weight, about 80 to 90 per cent rosin and about 20 to 10 per cent paraffin to be especially suitable for this purpose.

Coils produced in accordance with the present invention are compact in structure, and have a high dielectric strength and a long service life. They are adapted for use as magnet coils, contactor coils, relay coils, solenoid coils, meter coils, transformer coils, field coils and the like.

What we claim as new and desire to secure by Letters Patent of the United States is:

1. An electrical coil comprising layers of a wound insulated conductor having sheet insulation between the individual layers, the bare inner and outer ends of said conductor being united to terminals to form joints therebetween, and a covering consisting of cellulose ester intimately and completely enveloping each of the said joints individually to insulate and moisture-proof the same.

2. An electrical coil comprising layers of a wound insulated conductor having sheet insulation between the individual layers, a flexible moisture-resisting material of high dielectric strength at least partly covering the last layer, terminals for said conductor exterior to said moisture-resisting material, the bare inner and outer ends of said conductor being united to said terminals to form joints therebetween, a covering consisting of cellulose ester completely and separately enclosing each of the said joints to insulate and moisture-proof the same, and an outer wrapping comprising fibrous material.

3. An electrical coil comprising a core, an enameled conductor wound in layers on said core, sheet layer insulation between the individual conductor layers and over the last layer thereof, a wrapping of varnished cambric over the said insulation and wound conductor, a terminal assembly bound upon said varnished cambric layer with a binding tape which is non-corrosive in the presence of moisture, the bare inner and outer ends of said conductor being united to terminals of said terminal assembly to form joints therebetween, a film consisting of cellulose acetate intimately and completely enveloping each of the said joints individually to insulate and moisture-proof the same, and an outer wrapping comprising fibrous material coated at least on its inner side with cellulose ester, said coil having at least its ends coated with an electrically insulating sealing and moisture-proofing composition.

4. An electrical coil comprising a core, an enameled conductor wound in layers on said core, paper layer insulation between the individual conductor layers and over the last layer thereof, a wrapping of sheet cellulose acetate upon the said insulation and wound conductor, a terminal assembly bound upon said cellulose acetate wrapping with an artificial silk tape having on its inner side a coating of an adhesive which is non-corrosive in the presence of moisture, the inner end of said conductor being led to one of said terminals through a wrapping of flexible moisture-resisting material of high dielectric strength, both the bare inner and outer ends of said conductor being united to said terminals to form joints therebetween, a film consisting of cellulose acetate deposited from solution state directly upon said joints to insulate and moisture-proof the same, an outer wrapping of flexible laminated insulating material comprising cloth having bonded to each side thereof sheet cellulose acetate, the entire coil being impregnated and coated with an electrically insulating composition.

5. In a method of making an electrical coil comprising layers of a wound insulated conductor, terminals for said conductor, and the bare inner and outer ends of said conductor united to said terminals to form joints therebetween, the improvement which comprises intimately and completely enveloping each of the said joints with an insulating layer consisting of cellulose ester and covering the wound conductor and cellulose-ester covered joints with an outer protective wrapping of fibrous material coated at least on its inner side with cellulose ester.

6. An electrical coil as in claim 4 wherein the electrically insulating composition with which the entire coil is impregnated and coated is a mixture of rosin and paraffin.

7. A method of producing an electrical coil which comprises winding an insulated conductor in layers on a core, placing sheet layer insulation between the individual conductor layers and over the last layer thereof, covering the said insulation and wound conductor with a wrapping of varnished cambric, positioning a terminal assembly having terminal extensions upon the wrapping of varnished cambric, binding the said assembly in place with a binding tape which is non-corrosive in the presence of moisture, removing the insulation from the inner and outer ends of the wound conductor, soldering the bare conductor ends to the said terminal extensions to form soldered joints therebetween, applying a solution of cellulose ester in a volatile solvent to each of the soldered joints, drying the treated joints to evaporate the solvent and solidify the cellulose ester, and covering the wound conductor and cellulose ester covered joints with an outer protective wrapping comprising fibrous material.

8. A method as in claim 7 which includes the additional step of coating at least the ends of the coil with an electrically insulating sealing and moisture-proofing composition.

HERMAN L. GRUPE.
JAMES A. ROBERTSON.
DON E. MORAN.